Oct. 8, 1929.  G. W. PEARSON  1,731,172

GLARE PREVENTER FOR AUTOMOBILE WINDSHIELDS

Filed Feb. 9, 1925

INVENTOR.

Patented Oct. 8, 1929

1,731,172

UNITED STATES PATENT OFFICE

GARDNER W. PEARSON, OF LOWELL, MASSACHUSETTS

GLARE PREVENTER FOR AUTOMOBILE WINDSHIELDS

Application filed February 9, 1925. Serial No. 7,743.

This invention relates to improvements in shields or glare eliminators adapted to be placed on the windshield of an automobile, and made of colored transparent material whereby the glare of approaching headlights will be reduced.

It is of the type where a sheet of celluloid or other similar material is held up against the inner or back side of the glass of the windshield, and its particular advantages are as follows:

It includes a spring clip by which the device can be instantly attached or detached to the top frame bar of the windshield, and in combination with this, a sheet of transparent colored material pivoted thereto in such a way that when down it will be held substantially flat against the back of the windshield but can be instantly raised and will be held in a position out of the line of sight of the operator, where it will be very inconspicuous.

It can be turned up or down instantly and will remain in either position resiliently but firmly and will not rattle.

In my preferred form, it can be slid sideways along the top frame bar of the windshield and thus brought in to the most convenient position across or near the line of sight of the operator or entirely away from it.

Instead of transparent, semi-transparent or opaque flat material might be used as a shield and the operator could then move his head to get the shield between his eyes and oncoming lights on the left of the road while he could still see the right of the road.

The most important features of my device are the sheet of transparent colored material so pivoted near but not at one edge to a clip member attached back of the windshield bar that the resiliency of the clip or of the sheet material will cause it either to lie flat against the glass or to remain steady in the raised position.

The peculiar feature of my device is in so hanging the sheet of transparent or other material that there will be a tail or projection on the other side of the pivot from the principal part of the sheet, whereby I utilize the principle of passing the dead center. By so utilizing, my shield can be swung up out of the way, or down into position by a single motion of the hand and it will remain either in the up or down position firmly but not so rigidly that it might be shaken out of position.

In the drawings Fig. 1 is a side elevation showing a sheet metal spring attached to a single sheet metal plate riveted to the celluloid.

Figure 1:
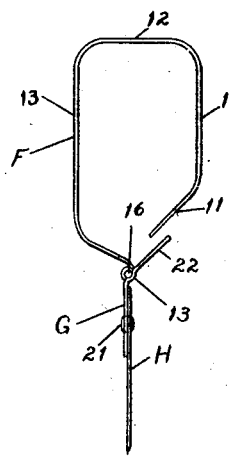

In the drawings, A represents the glass of a windshield and B the top frame bar thereof while C represents the front upper frame of the top whether that is of the folding open car type, or closed body type.

F is a spring clip made of spring metal which is shown in Figs. 1, 2, 3, 4, and 5, as being a flat spring having the top member 12, and front and back members 10 and 13.

Front member 10 preferably is of such length that its lower end 11 can be bent in so as to extend down below bar B and rest against the glass A.

The top member 12 is preferably flattened and of a length slightly greater than the thickness of bar B. With this construction, the end 11 can be slipped in between the top frame C and bar B even if the space is very small, and when in place spring F will be held snugly as it fits fairly close to bar B.

The end 14 of back member 13 preferably slopes at an angle with the glass and is bent slightly outward at its tip into a loop 15 which forms a pivot part to receive a pivot pin 16. This end 14 serves as a stop for hinge member G and sheet H when the device is raised, as shown in Fig. 3.

H is a sheet of transparent colored material, preferably celluloid, pivoted near one edge to the tip 15 of the back clip member, and having a steadying fin 22 which extends at an angle with the rest of the sheet towards the front clip member.

As shown, the sheet H is attached by means of rivets 21, 21, to hinge member G which is shown as made of sheet metal 20 cut away and bent at 24 downward, and at 25 and 26 upward in the form of grooves for the hinge pin 16, by which it is pivotally attached to clip F. At 23, 23, it is again bent downward.

Figure 2:
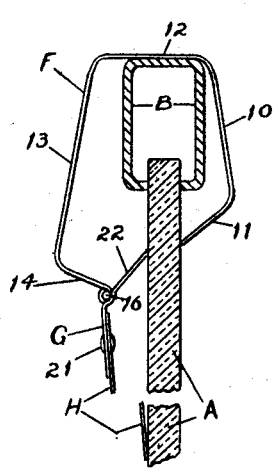
Fig. 2 is the same sprung in place over the top bar, with the shield down.
Figure 3:
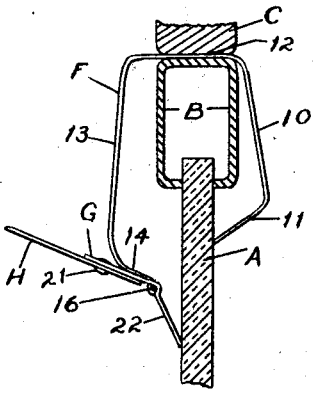
Fig. 3 is the same as Fig. 2 with the shield up.
Figure 4:
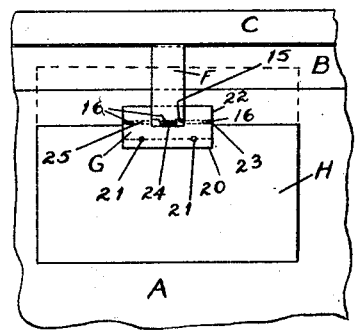
Fig. 4 is a view from the left of Fig. 2, but smaller.
Figure 5:
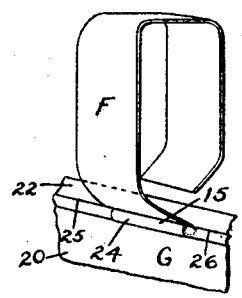
Fig. 5 is a perspective of the spring and part of the hinge plate.

As shown in Figs. 2 and 3, when the sheet H is lowered, the fin 22 and spring F hold it flat against the glass, and when it is not in use, it can instantly be lifted as shown in Fig. 3, when the fin 22 and the stop 14 will hold it at an angle, up out of the way.

Figure 6:
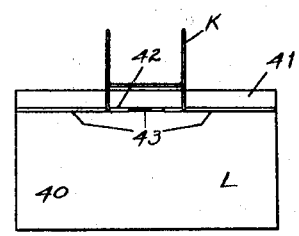
Fig. 6 is a view similar to Fig. 4, with a wire spring clip and the celluloid shaped to receive the ends thereof and serving as a hinge itself.

Instead of using a separate hinge plate G, I can, as shown in Fig. 6 at L, so bend the celluloid sheet 40 as to form a fin 41, and also bend it upward at 42, and downward at 43 to form a groove for a hinge pin 16, or for the wire spring clip K shown.

This wire spring clip K may be used in place of F, and comprises a top member including two parts 33, 33, back member 32, 32, connected together by 30 and sloping at the bottom 31, 31, front members 34, 34, which bend inward at 35, 35, and terminate in oppositely disposed hinge pin members 36, 36. These members 36 as shown in Fig. 6 pass into the grooves 42 and 43, and thereby the parts are hinged together.

Figure 7:
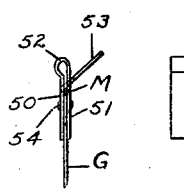
Fig. 7 is a side elevation and Fig. 8 a front elevation of a doubled-over type of hinge plate.
Figure 8:
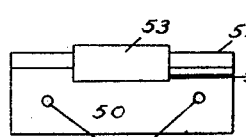

As shown in Figs. 7 and 8, I may use another type of hinge member M formed of a plate of sheet metal bent into parallel leaves 50 and 51 which embrace the sheet G and are bent around and up at 52 and have a part forming a fin 53 cut out from the metal at 55. 54 represents rivet holes.

Figures 9, 10:
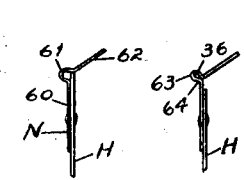
Fig. 9 is a side elevation of another modification of hinge plate.
Fig. 10 is a view similar to Fig. 9 of another modified form of hinge plate.
Figure 11:
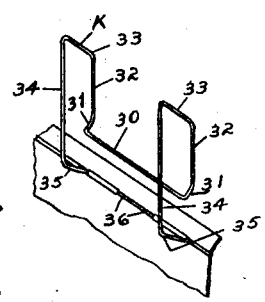
Fig. 11 is a perspective of the wire spring clip construction, with a hinge plate like Fig. 10.

Another form of hinge plate is shown at N in Fig. 9. The body 60 has rivet holes not shown, by which it is attached to sheet H, and at 61 it is bent upward into a U-shaped loop to receive a pivot pin or pivot ends like 36, and again bent downward to form a fin 62. The sheet H may be brought up so as to close the opening of 61 and to prevent the pivot pin from getting out, or as shown in Fig. 10, the loop itself 63 may be pinched in at 64 to prevent the pivot pin or pivot ends 36, 36, from coming out.

Figure 12:
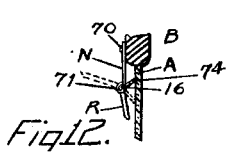
Fig. 12 shows a flat clip, used for holding my flat sheet of material in place, screwed to the windshield frame.

I consider that the transparent sheet includes the hinge plate and fin and I may make the fin thin and resilient as shown at 74 in Fig. 12.

The clip such as N may be attached by screw 70 to bar B and may have a pivot part 71, by which and pin 16, sheet R may be pivoted. Clip N may be elastic and fin 74 stiff, or clip N may be rigid and fin 74 elastic, or both may be elastic or springy.

Figure 13:
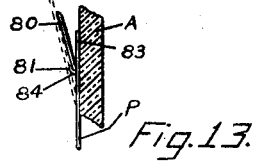
Fig. 13 is a modification of my device.

As shown in Fig. 13, the fin such as 83 may be a prolongation of sheet P and in the same plane extending beyond the pivot line 84 of sheet P and pivot part 81 at the tip of back member 80 of a spring clip. The operative position is shown in the full lines and the up position by the dotted lines.

I claim:

1. In a glare shield for automobile windshields having a glass plate and a top frame bar; the combination of a spring clip made of spring metal having a top and front and back members adapted to be sprung over the top frame bar whereby it is held in position so that the end of the back member slopes at an angle with the glass and its tip includes a pivot part; with a sheet of transparent colored material pivoted near one edge to the pivot part of the tip of the back member of the spring clip and having a steadying fin which extends at an angle with the rest of the sheet towards the front clip member, the fin and sloping end of the back member of the clip being at such angles that the sheet material will be held by the spring clip snugly and resiliently in position against the glass plate or against such sloping end.

2. In a glare shield for automobile windshields having a glass plate and a top frame bar; the combination of a clip attached to the top frame bar and having a resilient back member which extends down therefrom and terminates in a pivot part proximate the glass plate; with a sheet of transparent colored material pivoted near one edge to the pivot part of the back member of the clip in such manner that the part between said edge and the pivot can be moved to both sides of the dead center plane of pressure between the pivot and the glass against the pressure of said back member.

GARDNER W. PEARSON.